US012558996B1

(12) United States Patent
Gonzalez et al.

(10) Patent No.: US 12,558,996 B1
(45) Date of Patent: Feb. 24, 2026

(54) DYNAMIC COOLING SYSTEM ARCHITECTURE

(71) Applicant: Endera Corporation, Casper, WY (US)

(72) Inventors: Alfredo Gonzalez, Corona, CA (US); John Joseph Walsh, Casper, WY (US)

(73) Assignee: Endera Corporation, Casper, WY (US)

( * ) Notice: Subject to any disclaimer, the term of this patent is extended or adjusted under 35 U.S.C. 154(b) by 144 days.

(21) Appl. No.: 17/973,002

(22) Filed: Oct. 25, 2022

Related U.S. Application Data

(60) Provisional application No. 63/271,582, filed on Oct. 25, 2021.

(51) Int. Cl.
B60H 1/00 (2006.01)
B60L 58/26 (2019.01)

(52) U.S. Cl.
CPC .......... B60L 58/26 (2019.02); B60H 1/00278 (2013.01); B60H 1/00392 (2013.01); B60H 2001/00307 (2013.01)

(58) Field of Classification Search
CPC ............ B60H 1/00278; B60H 1/00392; B60H 2001/00307; B60L 58/26
See application file for complete search history.

(56) References Cited

U.S. PATENT DOCUMENTS

| | | | | |
|---|---|---|---|---|
| 9,758,010 B2 * | 9/2017 | Johnston | ............ | B60H 1/00385 |
| 9,844,995 B2 * | 12/2017 | Rawlinson | ......... | B60H 1/32281 |
| 11,142,036 B2 * | 10/2021 | Rapp | ...................... | B60W 10/30 |
| 2012/0183815 A1 * | 7/2012 | Johnston | ................. | B60L 58/26 429/50 |
| 2019/0366800 A1 * | 12/2019 | Durrani | .............. | B60H 1/00921 |
| 2020/0062106 A1 * | 2/2020 | Wong | ...................... | B60L 58/27 |
| 2020/0220236 A1 * | 7/2020 | Durrani | .............. | H01M 10/667 |
| 2020/0398636 A1 * | 12/2020 | He | ...................... | B60H 1/00507 |
| 2020/0398639 A1 * | 12/2020 | Maeda | ............... | B60H 1/00485 |
| 2021/0188043 A1 * | 6/2021 | Smith | ................ | B60H 1/00278 |
| 2021/0260959 A1 * | 8/2021 | Nakahara | ........... | B60H 1/00764 |

* cited by examiner

*Primary Examiner* — Eric S Ruppert
*Assistant Examiner* — Hans R Weiland
(74) *Attorney, Agent, or Firm* — Rutan & Tucker, LLP

(57) ABSTRACT

Embodiments of the invention are directed to a thermal system for an electric vehicle. The thermal system features a vehicle control system and a first control valve. The first control valve, upon placement into a first operational state by the vehicle control system, separates a flow of coolant used to thermally adjust one or more components within the electric vehicle into parallel thermal loops from a serial thermal loop. The parallel thermal loops include a first thermal loop responsible for thermal adjustment of a plurality of battery packs and a second thermal loop responsible for thermal adjustment of a drivetrain including at least an electric motor. The thermal system may further include a second control valve that, upon placement into a first operational state by the vehicle control system, routes the flow of coolant to bypass a radiator of the electric vehicle prior to routing to the first control valve.

18 Claims, 7 Drawing Sheets

DYNAMIC COOLING SYSTEM ARCHITECTURE

CROSS-REFERENCE TO RELATED APPLICATIONS

This application claims the benefit of priority on U.S. Provisional Application No. 63/271,582 filed Oct. 25, 2021, the entire contents of which are incorporated by reference herein.

FIELD

Embodiments of the disclosure relate to the field of transportation, and more specifically, one embodiment of the disclosure relates to a vehicle-based, thermal system with dynamically adjustable flow paths based on the vehicle's drive profile and environmental conditions.

GENERAL BACKGROUND

Multi-passenger transportation provides many benefits to individuals, communities, and the local economy. Public transportation and other multi-passenger transportation services reduce air pollution and traffic congestion that plague cities, especially in high density areas. As a greater use of multi-passenger transportation may assist in mitigating global climate change and overcrowded streets, the electrification of mass-transit vehicles could provide more immediate benefits to our environment and assist in our fight against climate change on a local and global scale.

It is well understood that electric vehicles require a battery pack and the performance of the battery pack is quite sensitive to at least environmental conditions. Before electric mass-transit vehicles can be developed on a large scale, these vehicles will need to deploy multiple battery packs, and the thermal systems for these vehicles will need to be configured to strictly manage performance of these on-board battery packs. Such management is essential to maximize driving distance so as to avoid frequent recharging of the vehicle during normal use, while at the same time, ensuring that passengers are provided a pleasant environment when seated in the cabin of the electric mass-transit vehicle. Unfortunately, there have been relatively few technological advances focused on multi-passenger transportation services, especially in their thermal system architectures.

Currently, for conventional vehicles with internal combustion engines, a powertrain cooling and heating system is implemented within a vehicle to provide radiant cooling or heating to different components within the vehicle. The mere addition of conduits to a conventional powertrain cooling and heating system would not be sufficient to achieve optimal battery performance. Instead, a complete redesign of the thermal system architecture for electric vehicles, especially electric mass-transit vehicles, is needed.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
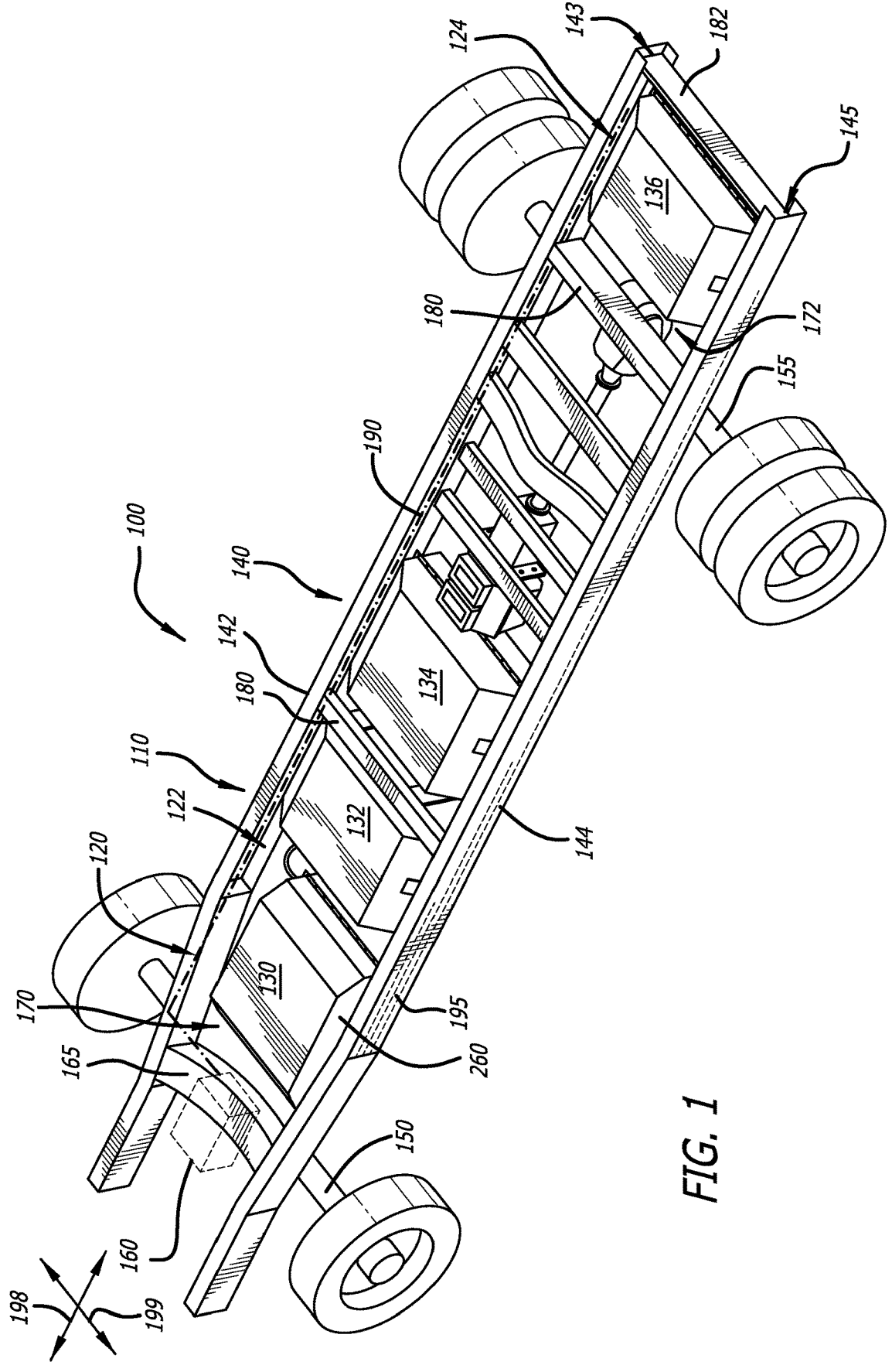
FIG. 1 is a perspective view of an exemplary embodiment of a chassis for an electric vehicle deploying a high-voltage (HV) battery pack system.

According to one embodiment of the disclosure, an improved architecture for a thermal system of an electric vehicle is described. The thermal system features a vehicle control system and a plurality of flow control components that set and alter the flow rate of and flow path for coolant (e.g., a liquid and/or gas that is used for heat transfer) delivered to different vehicle components. In particular, the vehicle control system includes flow control logic configured to select the flow rate and flow path for the coolant being delivered to the vehicle components via conduits (e.g., hoses, tubing, etc.). The flow control components are responsible for effectuating the setting and altering of the flow rate and flow path based on control signals received from the flow control logic. The coolant supports heat transfer from or to vehicle components based on conduction (e.g., heat transfer from or to the coolant based on physical contact with the vehicle components and/or one or more components in thermal connection to the vehicle components) and/or convection (e.g., provide heat transfer based on the propagation of the coolant through the conduits).

More specifically, as part of the thermal system architecture, a plurality of conduits are interconnected by flow control components (e.g., valves, pumps, etc.) and temperature control components (e.g., chiller, heater, condenser, heat exchanger, etc.). According to this embodiment of the disclosure, the flow control components may be positioned to alter flow paths of the coolant propagating through these conduits in response to signaling from flow control logic (also referred to as a "flow controller") included as part of the vehicle control system. The flow controller may be software or a combination of software and hardware that, based on operation rules formulated from thermal modeling (e.g., software models) or training (e.g., machine learning or other artificial intelligence software), alters the flow paths of coolant through a network of conduits. The alteration of the flow paths is designed to concentrate on the cooling or heating of targeted vehicle components, such as high-voltage (HV) battery packs that power the electric vehicle and whose performance is highly correlated with the driving profile and/or environmental conditions currently experienced by the vehicle.

According to one embodiment of the disclosure, the flow controller may be communicatively coupled to one or more of the flow control components. Based on control signaling from the flow controller in accordance with determined operation rules, certain flow control components may be re-configured to (i) receive coolant from a different input source and/or (ii) route the received coolant to a different output source. The re-configuration may be conducted to change the flow path for the coolant between a plurality of different flow paths, including a first flow path and a second flow path. Herein, the first flow path may be referred to as "parallel thermal loops" and a second flow path may be referred to as a "serial thermal loop, respectively".

As described below, the serial thermal loop corresponds to a flow of coolant propagating through the conduits in accordance with a single, continuous flow path, where the serial thermal loop is inclusive of a wide range of vehicle components, including the drivetrain components (e.g., motor, gearbox, etc.), HV battery packs, other thermal sources generating heat as a by-product of their operations (e.g., power converter, charger, drive inverter, etc.), and thermal sinks conducting heat removal (e.g., oil heat exchanger, radiator, etc.). In contrast, the parallel thermal loops are formed as a segmentation of the serial thermal loop. Herein, the parallel thermal loops include a first thermal loop and a second thermal loop. The first thermal loop is configured to provide a flow path for a first volume of the coolant currently within conduit surrounding the HV battery packs to concentrate on thermal management of the HV battery packs. The second thermal loop is configured to provide a flow path for a second volume of the coolant, other than the first volume of coolant, to concentrate on thermal management of the remainder of these vehicle components.

As an illustrative example, the flow control components may include a plurality of multi-port control valves, such as a first (four-way) control valve and a second (three-way) control valve for example. The first control valve includes a first plurality of inputs and a second plurality of outputs, where the number of inputs may be equivalent to the number of outputs, albeit the number of inputs may differ from the number of outputs. The first control value is responsible for altering the flow path for the coolant between the serial thermal loop scheme and the parallel loops scheme. The second control valve is configured with a plurality of inputs and an output, which receives coolant from either (i) the radiator via a first input of the plurality of inputs or (ii) a reservoir via a second input of the plurality of input. The usage of the second input of the second control valve is designed to bypass the radiator to avoid unintended thermal effects due to harsh exterior (environment) conditions.

More specifically, in response to a first control signal from the flow controller, the first control valve is configured with a first input port in fluid communication with a first output port and a second input port in fluid communication with a second output port to create a serial thermal loop within the electric vehicle. However, in response to receiving a second control signal from the flow controller, the first control valve is configured so that the first input port is in fluid communication with the second output port and the second input port is in fluid communication with the first output port to generate parallel thermal loops. These parallel thermal loops separate thermal management between different types of vehicle components, such as the thermal management of the HV battery packs from thermal management of the vehicle components (e.g., motor, gearbox, etc.) forming the drivetrain.

The flow controller transmits the first control signal or the second control signal based on analytics conducted with respect to the drive profile of the vehicle and environmental conditions. The drive profile constitutes monitored parameters directed to current vehicle operability. For example, the drive profile may be associated with (i) measured temperature for certain vehicle components and/or (ii) electrical loads being consumed by different vehicle components or systems. The electrical load may be based, at least in part, on (a) terrain (e.g., uphill, downhill, etc.), (b) speed, (c) selected passenger controls (e.g., heating, ventilation and cooling (HVAC) select for the interior cabin, drive selection (all wheel v. rear wheel), etc.), (d) charging state, or the like. The environmental conditions may include the outside temperature.

Herein, the flow controller may be communicatively coupled to one or more sensors associated with the temperature control components and/or the flow control components. A first set (i.e., one or more) of sensors may be adapted to measure (i) the temperature as measured by the temperature control components and/or (ii) the temperature of the coolant input and/or output from the temperature control components. According to one embodiment of the disclosure, each of the first set of sensors may be adapted as a temperature sensor located proximate to, implemented on, or integrated as part of a temperature control component. Similarly, a second set of sensors may be adapted as flow rate sensors that are configured to measure the egress and/or ingress flow rate of the coolant at various locations within the electric vehicle. Each of the flow rate sensors may be located proximate to, implemented on, or integrated as part of a flow control component.

As both the flow path and the flow rate are correlated with and thereby effect the amount of heat transfer (convection) from different vehicle components, the flow controller may adjust the flow path and/or flow rate provided by one or more of the flow control components to "tune" the degree of heat transfer needed based on the drive profile and the environmental conditions, especially the heat transfer needed to provide a selected thermal environment for the vehicle's HV battery packs. For example, when greater cooling or heating of the HV battery packs is required, the flow controller may initiate the second control signal to alter operability of the thermal system in accordance with the parallel thermal loops scheme. Additionally, the flow controller may signal one or more of the flow control components (e.g., one or more pumps, valves, etc.) to increase the flow rate over a particular segment of the conduits proximate to the HV battery packs to provide greater cooling or heating effects (i.e., increased convection).

I. Terminology

In the following description, certain terminology is used to describe aspects of the invention. In certain situations, the term "member" is a general representation of a mechanical structure and the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial elements (AND gates, OR gates, NOR gates, NAND gates, or the like).

Alternatively, or in combination with the hardware circuitry described above, the logic may be software in the form of one or more software modules. The software modules may include an executable application, a daemon application, an application programming interface (API), a subroutine, a function, a procedure, a plug-in, an applet, a servlet, a routine, source code, a shared library/dynamic load library, or one or more instructions. The software module(s) may be stored in any type of a suitable non-transitory storage medium, or transitory storage medium (e.g., electrical, optical, acoustical, or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device.

A "vehicle" generally refers to a multi-passenger conveyance such as an automotive conveyance, inclusive of a mass-transit electric vehicle (e.g., shuttle, a bus, van, limousine, etc.), an airplane, a train, or the like. According to one embodiment, the automotive conveyance may be a low-emission, plug-in electric vehicle such as an electric shuttle, electric bus, or other type of electric vehicle. However, it is contemplated that the electric vehicle may include an internal combustion engine to operate in concert with an electric motor.

A "vehicle component" generally refers to one or more mechanical or electro-mechanical devices involved in the operability of an electric vehicle. Examples of a vehicle component may include, but are not limited or restricted to an electric motor, gearbox, power converter, HV battery pack, charger, chiller, heater, pump, condenser, or the like.

A "chassis" generally refers to the main support structure of a vehicle to which other components are attached. Herein, the chassis includes a pair of frame rails and one or more cross members. Each "frame rail" is a component of a vehicle chassis that extends longitudinally along a driver-side or passenger-side of the vehicle exceeding in length a distance from the vehicle's front axle to a vehicle's back axle. A "cross member" generally refers to a component arranged for extending between and coupling to the pair of frame rails forming the vehicle chassis. Collectively, the frame rails and the cross member(s) form an integral part of the chassis.

A "flow control component" generally refers to a mechanical or electro-mechanical device that regulates the flow rate of a coolant propagating into and/or from the component, where the coolant may be a fluid, air, or other gaseous mixture utilized to apply or remove heat from a vehicle component. Similarly, a "temperature control component" generally refers to a mechanical or electro-mechanical device that is configured to remove heat from or transfer heat into the coolant.

The term "signal" generally refers to a transmission of data in digital form, data in analog form, or pulse-width modulation (PWM) data. The signal may be transmitted over a wired or wireless communication medium.

The term "computerized" generally represents that any corresponding operations are conducted by hardware in combination with software and/or firmware. The term "concurrently" generally represents two operations being performed at least partially overlapping in time.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Electric Vehicle Infrastructure

Referring to FIG. 1, a perspective view of an exemplary embodiment of a chassis 110 of an electric vehicle 100 deploying a multiple high-voltage (HV) battery pack system 120 (hereinafter, "battery pack system") is shown. As shown, the battery pack system 120 may be implemented as a four-battery pack system with all of the HV battery packs 130, 132, 134 and 136 deployed between frame rails 140 of the chassis 110 that extend beyond a front axle 150 and a back axle 155. A vehicle control system (VCS) 160, which is part of the vehicle's thermal system (described below) and is configured to control coolant distribution throughout the electric vehicle 100, is positioned on the chassis 110 such as positioned on a cradle 165 situated above the front axle 150.

Herein, the four-battery pack system 120 includes a first battery pack subsystem 122, which includes three HV battery packs 130, 132, and 134. Herein, the first HV battery pack subsystem 122 is installed within a first installation area 170 defined by a first frame rail 142, a second frame rail 144, the cradle 165 (or a front axle 150) and a first cross member 180 (or the rear axle 155). The four-battery pack system 120 further includes a second battery pack subsystem 124, which includes a fourth HV battery pack 136 installed within a second installation area 172 defined by the first frame rail 142, the second frame rail 144, the first cross member 180, and a second cross member 182. All of these HV battery packs 130, 132, 134 and 136 are secured to the chassis 110 through mounting brackets (not shown) that are correspondingly coupled to both the HV battery packs 130, 132, 134 and 136 as well as the first and second frame rails 142 and 144.

Referring still to FIG. 1, the first frame rail 142 is constructed to create a channel 143 configured to retain one or more high-voltage power interconnects 190 for the transmission of voltage and amperage to and from the HV battery packs 130, 132, 134 and 136. Similarly, the second frame rail 144 is constructed to create a channel 145 configured to retain another type of interconnect, namely one or more conduits 195 that enable the conveyance of coolant throughout the electric vehicle 100 to alter or maintain the operating temperature of components deployed within the chassis 110 with a prescribed temperature range in efforts to optimize performance of such components.

As further shown in FIG. 1, each of the HV battery packs 130, 132, 134 and 136 is positioned in a selected orientation, namely a "longitudinal orientation" where lengthwise sides of a housing for a HV battery pack are oriented in a first (longitudinal) direction 198 in parallel with the frame rails 140 or a "latitudinal orientation" where the lengthwise sides of a housing for a HV battery pack are oriented orthogonal to the frame rails 140 in a second (latitudinal) direction 199. Herein, the first HV battery pack 130 is positioned with a longitudinal orientation while the second, third and fourth HV battery packs 132, 134 and 136 are positioned with a latitudinal orientation.

III. Thermal System Architecture

Figure 2:
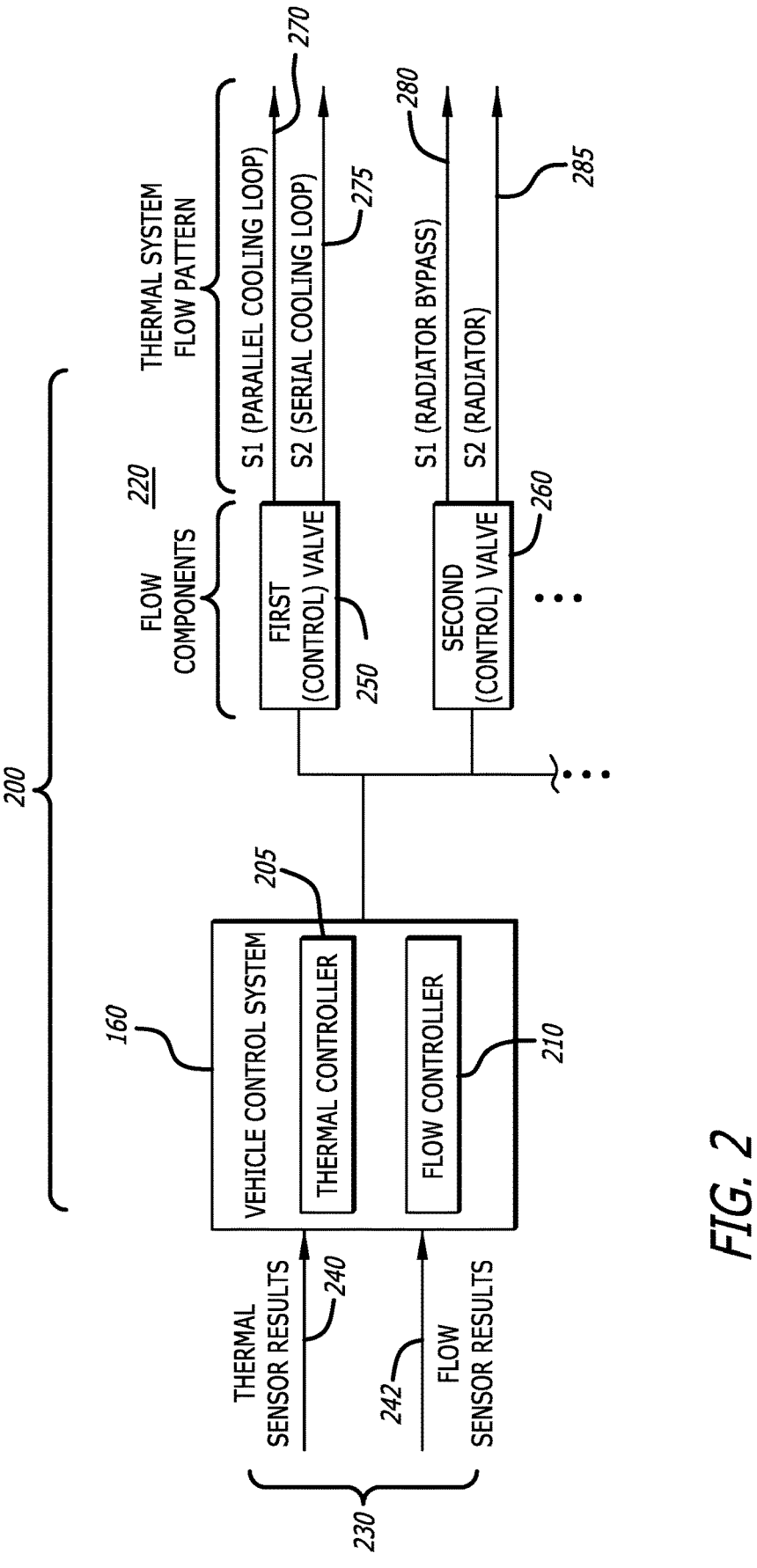
FIG. 2 is a general embodiment of the thermal system deployed within the electric vehicle of FIG. 1.

Referring to FIG. 2, a general embodiment of the thermal system 200 deployed within the electric vehicle 100 of FIG. 1 is shown. The thermal system 200 includes the vehicle control system 160 and a plurality of flow control components 220 interconnected by the conduit 195 routed throughout the electric vehicle 100. Herein, according to one embodiment of the disclosure, the vehicle control system 160 features at least thermal monitoring logic (hereinafter, "thermal controller") 205 and flow control logic (hereinafter, "flow controller") 210. The flow controller 210 is configured to monitor and/or change an operating state of one or more of the flow control components 220, which can alter the selected flow path based on detected conditions of the electric vehicle 100. These detected conditions may include conditions monitored by the thermal controller 205.

More specifically, the flow controller 210 may be configured to monitor and/or change an operating state of one or more of the flow control components 220, which alters a current flow path supported by the thermal system 200, based on detected conditions of the electric vehicle 100. For example, one of these detected conditions may involve the drive profile of the vehicle, namely the measured electrical loads currently being consumed by different vehicle components or systems and the sensed temperatures of certain vehicle components (e.g., HV battery packs, motor, etc.) and/or coolant at different locations within the electric vehicle 100. The electrical loads utilized by different vehicle components or systems may be influenced by the particular operations of the vehicle, including (a) the type driving terrain driven by the vehicle (e.g., uphill, downhill, etc.), (b) speed, (c) selected passenger controls (e.g., heating, ventilation and cooling (HVAC) select for the interior cabin, drive selection (all wheel v. rear wheel), etc.), (d) charging state, or the like. Another of these detected conditions may include environmental conditions such as the outside temperature monitored by the electric vehicle 110.

For example, the vehicle control system 160 may be configured to receive signaling 230 associated with the detected conditions from different sensors distributed throughout the electric vehicle such as thermal sensors and flow sensors for example ("push-based" data collection). Additionally, or in the alternative, the vehicle control system 160 may be configured to receive such signaling 230 by accessing data maintained within a non-transitory storage medium ("pull-based" data collection).

As shown in FIG. 2, the signaling 230 may include, but is not limited or restricted to measured results, including thermal sensor results 240, and flow sensor results 242 received by the thermal controller 205. The thermal sensor results 240 may include measured temperature(s) of vehicle components and/or measured temperatures of circulated coolant at different locations within the electric vehicle 100. The flow sensor results 242 may include measured flow rate of the coolant received and/or output from one or more of the flow control components. Based on these sensor results 240/242, the flow controller 210 may determine the state(s) to be assigned to the flow control components 220, such as a plurality of control valves deployed within the thermal system 200.

More specifically, the flow controller 210 is configured to manage at least two control valves included as part of the flow control components 220, based at least on the sensor results 240/242; namely, a first control valve 250 and a second control valve 260. The first control valve 250 may be configured as a four-way valve that controls a flow path of coolant through the electric vehicle 100 of FIG. 1 as either parallel thermal flow paths (loops) 270 (see FIG. 4) or a serial thermal loop 275 (see FIG. 5). It is noted that the parallel thermal loops 270 feature separate flows of coolant propagating concurrently to concentrate (and isolate) thermal management on one or more targeted components, such as the HV battery packs 130, 132, 134 and 136. In particular, placement of the first control valve 250 in a first state (S1) would isolate a certain volume of coolant to flow within each thermal loop of the parallel thermal loops 270 (i.e., separate thermal loops operating concurrently to each other), which include a powertrain thermal loop and a battery thermal loop as shown in FIGS. 3A-5.

When placed in a second state (S2), the first control valve 250 would route the coolant previously flowing within the parallel thermal loops 270 as an aggregate coolant flowing through the serial thermal loop 275. As a result, the time separation between the cycling of the coolant to remote/add heat to a particular vehicle component may be extended (lengthened) when the propagation distance of the coolant has increased without a corresponding increase in flow rate. As described below, the selection between the serial thermal loop 275 and the parallel thermal loops 270 is correlated to the environmental conditions imposed on the vehicle 100 (e.g., temperature of a monitored component caused by outdoor temperature) as well as the drive profile representative of the vehicle's state of operation (e.g., increased power drain caused by difficult driving conditions such as driving up a significant grade hill, high HVAC output, etc.).

The flow controller 210 is further configured to control the state of the second control valve 260, namely a three-way valve that may be configured to select a flow path of the coolant through a radiator or a flow path of the coolant to exclude the radiator. As shown, when placed in a first state (S1), the second control valve 260 is configured to receive coolant through a radiator bypass coolant path 280 that avoids passing through the radiator. This condition may occur when the vehicle is started in extremely cold or heat conditions in which the unintended thermal effects by the radiator would be applied to the coolant. As a result, additional power would be needed to apply additional heat or cooling to offset the unintended thermal effects. The cost of additional power effectively lessens the realized performance of the electric vehicle by lessening vehicle driving distance and/or drive time. Otherwise, when placed in a second state (S2), the second control valve 260 is configured to receive coolant through a radiator path 285 via the radiator, which provides additional cooling of the coolant as it is passing therethrough.

Figures 3A, 3B, 3C:
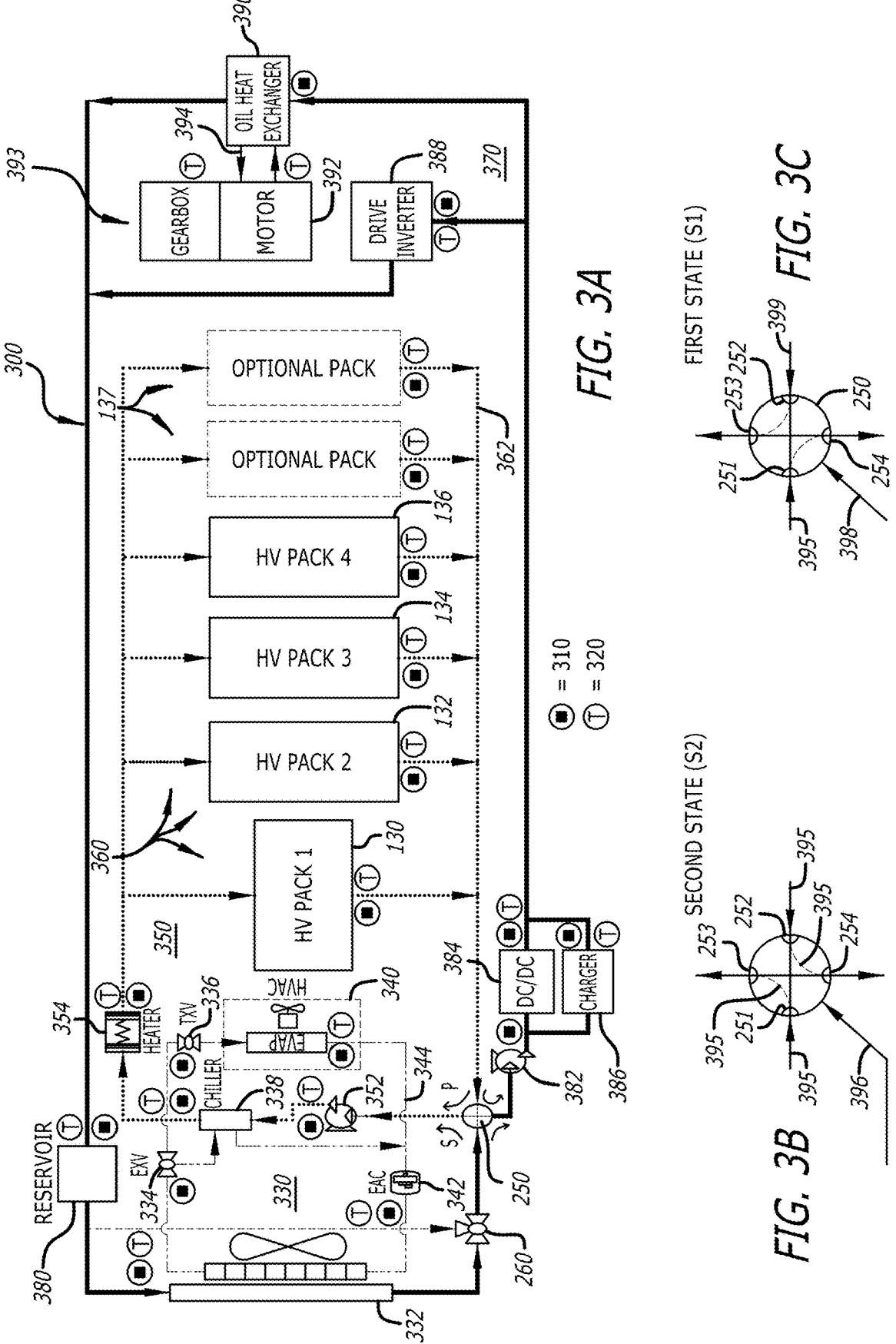
FIG. 3A is an embodiment the thermal system architecture of FIG. 2, including flow and temperature sensors for monitoring operability of the thermal system.
FIG. 3B is a first illustrative embodiment of a first control valve of the thermal system of FIG. 3A setting the thermal system to operate in accordance with a serial thermal loop adapted to maintain the battery pack system in a prescribed environmental state to achieve optimal performance.
FIG. 3C is a second illustrative embodiment of the first control valve of the thermal system of FIG. 3A setting the thermal system to operate in accordance with parallel thermal loops adapted to maintain the battery pack system in a prescribed environmental state to achieve optimal performance.

Referring now to FIG. 3A, a more detailed embodiment of the architecture of the thermal system 200 of FIG. 2 is shown. Herein, the thermal system architecture 300 features flow rate sensors 310 located proximate to, mounted on, or integrated as part of the flow control components. Additionally, the thermal system architecture 300 features temperature sensors 320, where the temperature sensors 320 may be located proximate to, mounted on, or integrated as part of selected vehicle components. Both sensors 310 and 320 may be deployed at different locations along the thermal loops, including a heating, ventilation and air conditioning (HVAC) thermal loop 330, a battery thermal loop 350, and a powertrain thermal loop 370, where the battery thermal loop 350 and the powertrain thermal loop 370 correspond to the parallel thermal loops 270 of FIG. 2.

The HVAC thermal loop 330 features a first plurality of components, including some or all of the following: a radiator 332, an exchange valve 334, a thermal expansion value 336, a chiller 338, an evaporator 340 and a compressor 342. The first plurality of components are interconnected together via a plurality of conduits 344 to receive coolant, such as a refrigerant for example, circulating through these components via the conduits 344.

As described above, the first control valve 250 is relied upon to select between a serial thermal loop scheme and the parallel thermal loops scheme, where the parallel thermal loops correspond to the battery thermal loop 350 and the powertrain thermal loop 370 and the serial thermal loop corresponds to a combination of the battery thermal loop 350 and the powertrain thermal loop 370 interconnected by the first control valve 250. The directional flow controlled by the first control valve 250 depending on its selected state (S1, S2) is illustrated in FIGS. 3B-3C and as described below.

Besides the first control valve 250, the battery thermal loop 350 features a second plurality of components, including pump 352, the chiller 338, a heater 354, a cluster of HV battery packs 360 (e.g. HV battery packs 130, 132, 134, 136 and one or more optional HV battery packs 137, and/or conduits 362 that provide coolant flow proximate to the HV battery packs 360. Sensors 310 and/or 320 are positioned at certain vehicle components to detect flow rate and/or temperature of the coolant propagating through the conduits 362 to warm or cool the HV battery packs 360. This may cause the flow controller 210 of FIG. 2 to adjust operability of the components positioned within the battery thermal loop 350 (e.g., first control valve 250, pump 352, chiller 338, heater 354, etc.) to address environmental conditions currently experienced by the HV battery packs 360 and adjust their environment (e.g., measured thermal state of the HV battery packs, etc.) towards a condition that is optimal for their performance. This condition may involve maintaining each of the HV battery packs within a prescribed thermal range such as between twenty-five (25° degrees Celsius and fifty) (50° degrees Celsius.

As shown, with respect to the battery thermal loop 350, flow sensors 310 may be positioned at the pump 352 to determine whether an adjustment to the operating speed of the pump 352 can be performed to maintain an optimal flow of coolant to better utilize heat convection. These flow sensors 310 may be positioned approximate to each of the HV battery packs 130, 132, 134, 136 and/or 137 to denote flow rates approximate to each of these HV battery packs 130, 132, 134, 136 and/or 137. Additionally, temperature sensors 320 may be positioned approximate to each of these HV battery packs 130, 132, 134, 136, and/or 137 to provide the temperature of the HV battery packs 130, 132, 134, 136, and/or 137 to the vehicle control system 160 of FIG. 1. The vehicle control system 160 is configured to determine if the chiller 338 needs to be adjusted to provide more cooling effects or if the heater 354 (e.g., positive temperature coefficient "PTC" heater) needs to be adjusted to provide additional heating effects to the HV battery packs 130, 132, 134, 136, and/or 137.

The powertrain thermal loop 370 features a reservoir 380, the radiator 332, a pump 382, power converter 384, a charger 386, a drive inverter 388 and an oil exchanger 390 that establishes a thermal coupling (i.e., oil loop 394) to a motor 392 of the powertrain 393. The powertrain thermal loop 370 is configured to intersect with the battery thermal loop 350 at the first control valve 250. When the first control valve 250 is placed in the second state (S2) as shown in FIG. 5

(described below), a flow of the coolant from the HV battery packs 130, 132, 134, 136 and/or 137 is precluded from directly returning into the battery thermal loop 350, but instead, transitions or flows to the pump 382 that provides the coolant to the power converter 384 and/or charger 386 before propagating the coolant to the drive inverter 388 and the oil exchanger 390 to provide cooling to these components.

Referring to FIGS. 3A-3C, when transitioning from the serial thermal loop 275 (second state S2) to the parallel thermal loop 270 (first state S1) deployment, coolant 395 within the battery thermal loop 350 and the powertrain thermal loop 370 may be adjustably routed by altering the outflows for a first input port 251 and second input port 252 of the first control valve 250 until a desired flow rate is detected by different flow rate sensors 310 positioned at various locations on these thermal loops (e.g., flow rate sensor positioned at inflows of pump 352 of the battery thermal loop 350 and pump 382 of the powertrain thermal loop 370.

Figure 5:
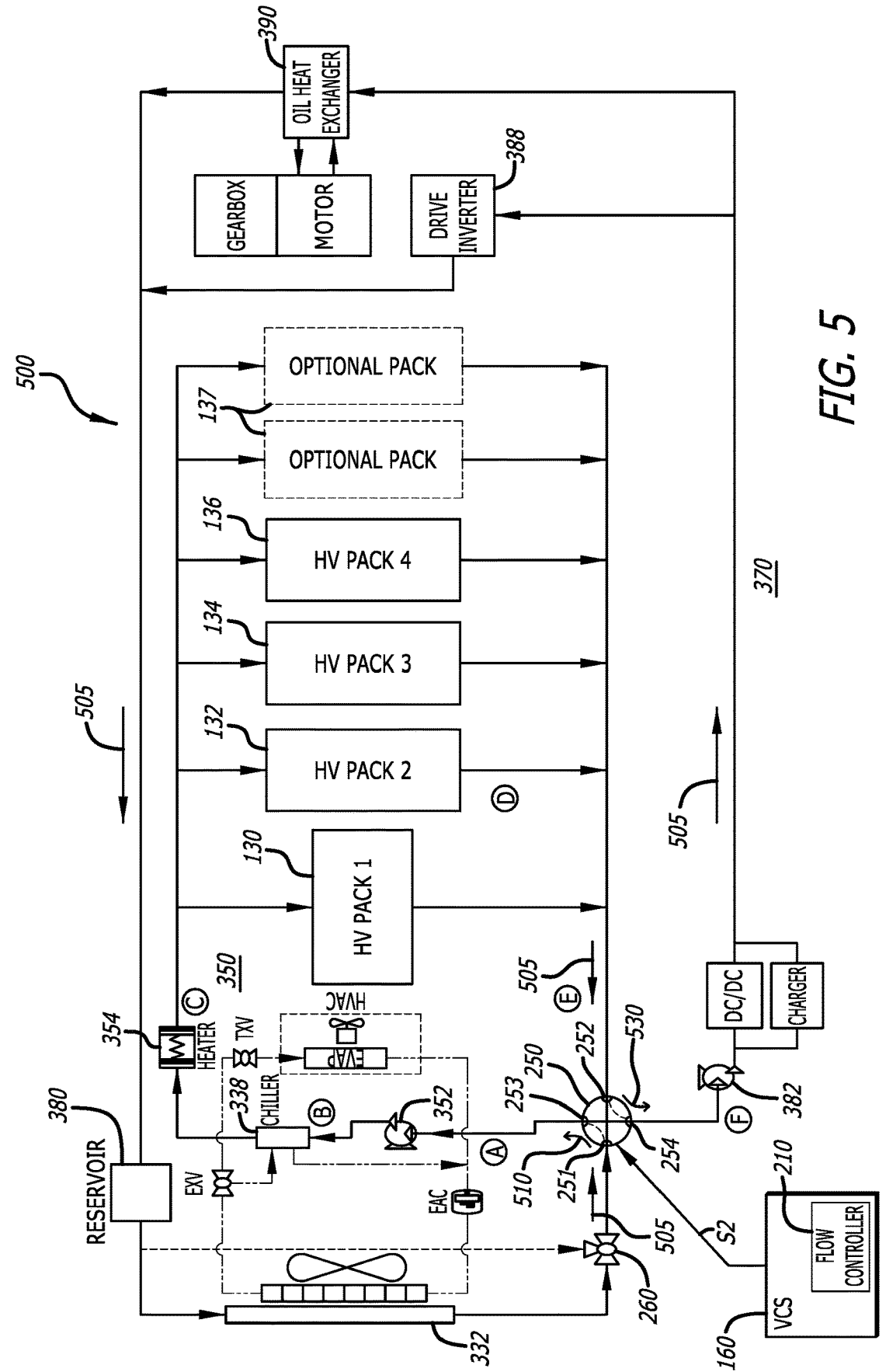
FIG. 5 is an embodiment of the thermal system architecture of FIGS. 3A-3C operating in accordance with a second flow path forming a serial thermal loop.

Herein, as shown in FIGS. 3A & 3B, in response to receiving a first control signal 396 from the flow controller 210 of FIG. 2, the first control valve 250 is placed in the second state (S2), where the first input port 251 is in fluid communication with a first output port 253 and the second input port 252 is in fluid communication with a second output port 254 to create the serial thermal loop 275 as shown in more detail in FIG. 5.

However, in response to receiving a second control signal 398 from the flow controller 120 as shown in FIGS. 3A & 3C, the first control valve 250 is placed in the first state (S1), where the first input port 251 is in fluid communication with the second output port 254 and the second input port 252 is in fluid communication with the first output port 253 to generate the battery thermal loop 350 along with the separate powertrain thermal loop 370. Hence, when the first control valve 250 is placed in the first state (S1), coolant propagation is isolated so that the coolant 399 already within the battery thermal loop 350 is not commingled with the control fluid 395 that is propagating through the powertrain thermal loop 370 as illustrated in FIG. 4 and described below.

In summary, each of the flow rate sensors 310 and the temperature sensors 320 provide results to the vehicle control system 160, which is configured to process these sensor results to determine alterations in fluid paths as well as alterations in operability of certain components to provide increased or decreased flow rate and/or increased or concentration of the coolant to the HV battery packs 130, 132, 134, 136 and/or 137. These adjustments are designed to improve the operability of the electric vehicle based on the environmental conditions that the electric vehicles experienced and the operational state of the electric vehicle.

IV. Thermal System Flow Paths

Figure 4:
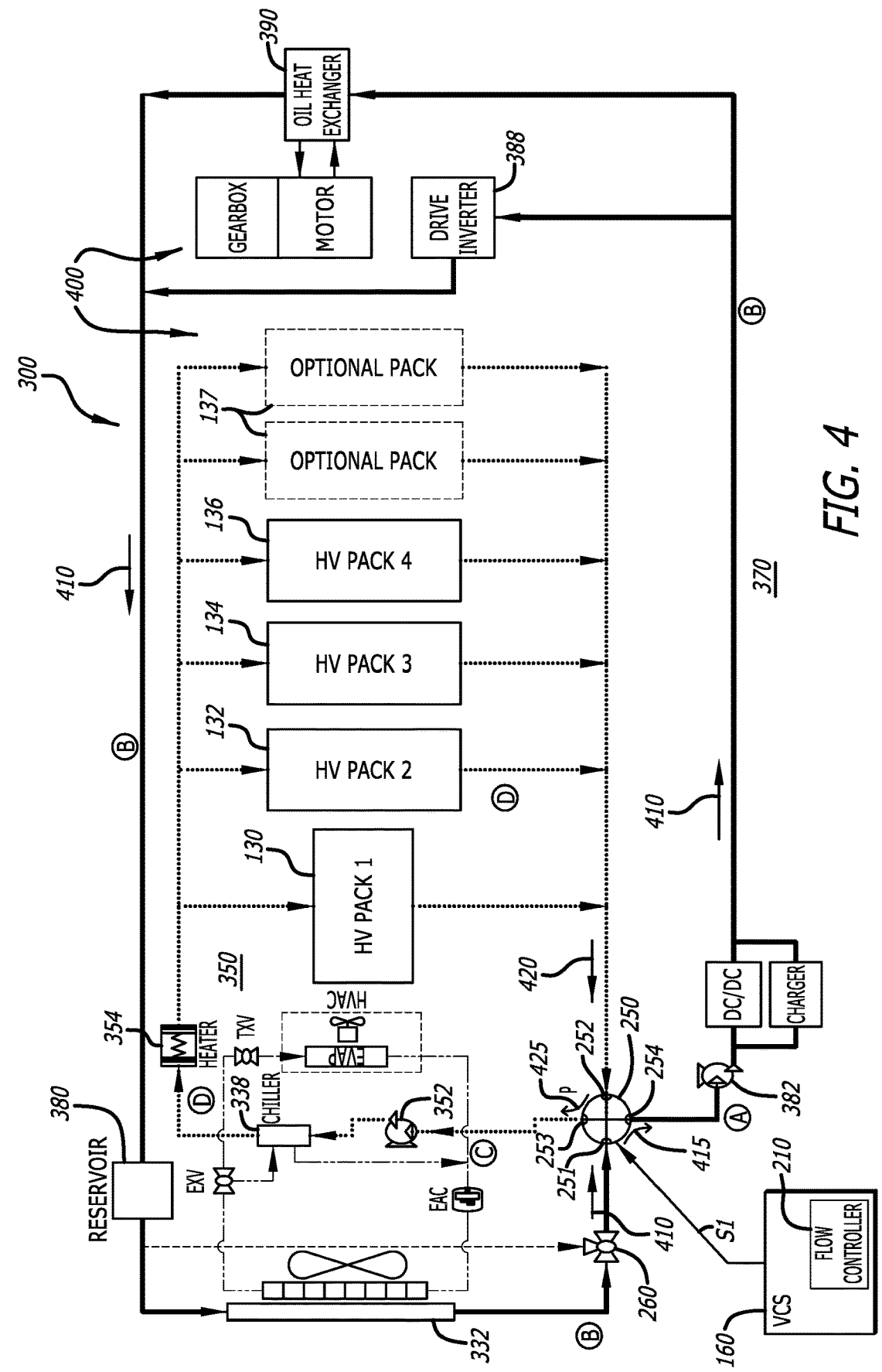
FIG. 4 is an embodiment of the thermal system architecture of FIGS. 3A-3C operating in accordance with a first flow path forming parallel thermal loops.

Referring now to FIG. 4, an embodiment of the thermal system architecture 300 illustrated in FIGS. 3A & 3C configured in accordance with a first flow path 400 (i.e., parallel thermal loops 270 of FIG. 2) is shown. Herein, the flow controller 210 of the vehicle control system 160 configures the thermal system architecture 300 to circulate coolant (e.g., coolant) in accordance with parallel thermal loops in which the powertrain thermal loop 370 is operating independently from the battery thermal loop 350. Hence, the temperatures and/or flow rates associated with coolant 410 propagating through the powertrain thermal loop 370 and coolant 420 propagating through the battery thermal loop 350 may be controlled to be different from each other.

As shown, the first control valve 250 is placed in a first state (S1) in which the first input port 251 of the first control valve 250 receives incoming coolant 410 and routes the incoming coolant 410 to the second output port 254 that is fluidly coupled to the pump 382 as represented by flow path arrow 415 (operation A). As a result, the incoming coolant 410 is circulated within the powertrain thermal loop 370 only (operation B). The powertrain thermal loop 370 provides cooling effects to the drive inverter 388 and the oil heat exchanger 390 and is routed back to the reservoir 380, which was then filled with the coolant 410. The coolant 410 is recirculated through the radiator 332 to provide additional cooling effects before the coolant 410 fed back into the first control valve 250 for recirculation over the powertrain thermal loop 370.

With respect to the battery thermal loop 350, coolant 420 already within the battery thermal loop 350 is recirculated by the first control valve 250. As shown, the first control valve 250 is configured by the flow controller 210 within the vehicle control system 160 (see FIG. 2) by directing the coolant 420 from the second input port 252 to the first output port 253. In particular, the second input port 252 is configured to receive the coolant 420 after heat has been extracted from (or added to) the HV battery packs 130, 132, 134, 136 and/or 137 and route the coolant 420 to the first output port 253. The first output port 253 is fluidly coupled to the pump 352 as represented by flow path arrow 425 (operation C).

Pump 352 is adapted to control the flow rate of the coolant 420 throughout the battery thermal loop 350. The battery thermal loop 350 further features (i) the chiller 338 configured to decrease the temperature of the coolant 420 and (ii) the heater 354 configured to increase the temperature of the coolant 420, which regulates the temperature of the coolant 420 before being returned to the HV battery packs 130, 132, 134, 136 and/or 137 (operation D). Although not shown, the operability of the pump 352, the chiller 338 and the heater 354 may be controlled by the vehicle control system 160 in response to the drive profile and environmental conditions experienced by the vehicle. By automatically retaining the HV battery packs 130, 132, 134, 136 and/or 137 within a temperature range for optimal performance (i.e. optimal temperature), the electric vehicle is likely to achieve better performance such as increased driving distance.

Referring now to FIG. 5, an embodiment of the thermal system architecture 300 of FIGS. 3A-3B configured in accordance with a second flow path 500 (i.e. serial thermal loop 275 of FIG. 2) is shown. Herein, the flow controller 210 of the vehicle control system 160 configures the thermal system architecture 300 to circulate coolant in accordance with a serial thermal loop that constitutes a serialized flow path through the battery thermal loop 350, and thereafter, through the powertrain thermal loop 370.

More specifically, upon receipt of coolant 505 from the second control valve 260, the first control valve 250 routes that coolant 505 from the first input port 251 to the first output port 253 as represented by flow path arrow 510 (operation A). From the first output port 253, the coolant 505 is routed to the pump 352 that circulates the coolant 505 through conduits 520 of the battery thermal loop 350. As shown, the coolant 505 propagates to the chiller 338, which may be controlled to apply cooling effects on the coolant 505 prior to routing to the HV battery packs 130, 132, 134, 136 and/or 137 (operation B). Additionally, the coolant 505 may be routed to the heater 354 (operation C). The heater 354 may be configured to apply heat to the coolant 505 as needed to increase the temperature of the coolant 505 to an optimal temperature based on computations by the flow controller 210 for maximum performance and efficiency of the HV battery packs 130, 132, 134, 136 and/or 137. The coolant 505 propagates through each of the HV battery packs 130, 132, 134, 136 and/or 137 to provide appropriate heating or cooling based on environmental conditions (operation D).

For this embodiment of the disclosure, the coolant 505 entering the battery thermal loop 350 is not isolated from the powertrain thermal loop 370 as illustrated in FIG. 4. Rather, the coolant 505 initially propagates through the battery thermal loop 350, and thereafter, propagates through the powertrain thermal loop 370. In particular, after flowing through the HV battery packs 130, 132, 134, 136 and/or 137, the coolant 505 is configured to flow into the second input port 252 of the first control valve 250 (operation E). In response to receipt of the coolant 505 in the second input port 252, the first control valve 250 is configured to route the coolant 505 to the second output port 254 that is fluidly coupled to the pump 382 as represented by flow path arrow 530 (operation F). At this stage in the flow process, the coolant 505 is now propagating through portions of the powertrain thermal loop 370 and will be routed through other components for coolant effects prior to return to the reservoir 380 for recirculation.

Figure 6:
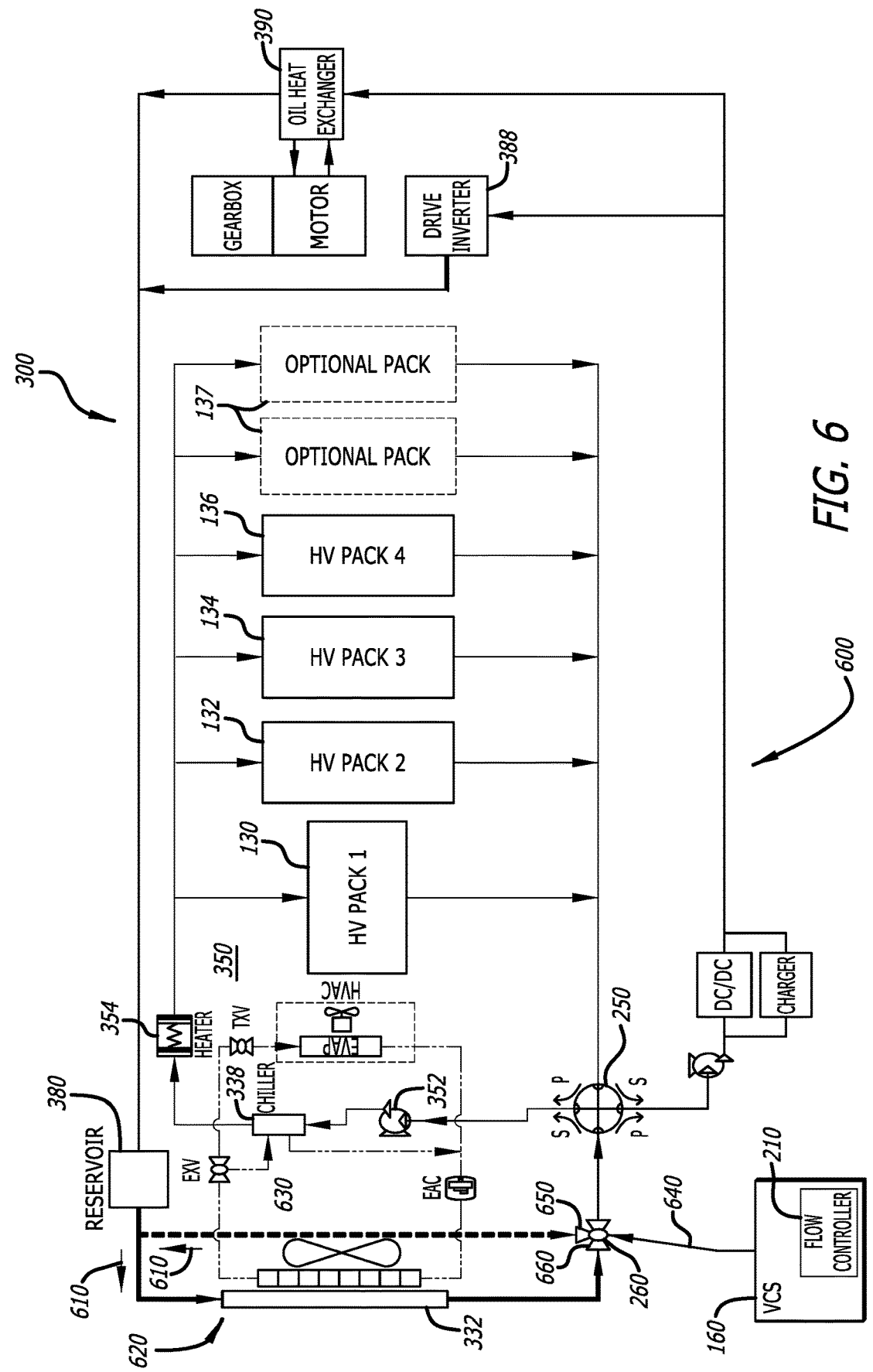
FIG. 6 is an embodiment of the thermal system architecture of FIGS. 3A-3C operating in accordance with a third flow path that modifies at least a segment of the first flow path or the second flow path to bypass a thermal sink.

Referring now to FIG. 6, an embodiment of the thermal system architecture 300 of FIGS. 3A-3C configured in accordance with a third flow path 600 being a modification of at least a portion of the first flow path 400 or the second flow path 500 to bypass a thermal sink (e.g., radiation 332) is shown. Herein, the coolant 610 may flow from the reservoir 380 through two different paths: a radiator path 620 or a bypass radiator path 630. In accordance with the radiator path 620, the coolant 610 flows through the radiator 332, which is configured to radiate heat from the coolant 610. The coolant 610 from the radiator 332 is routed into the second control valve 260, which is responsible for setting the flow of coolant 610 via either a radiator path 620 or a radiator bypass path 630 prior to propagation to the first control valve 250. The flow controller 210 of the vehicle control system 160 is configured to manage the selection of the radiator path 620 or the radiator bypass path 630 based on the drive profile and environmental conditions currently experienced by the electric vehicle.

As an illustrative example, when the electric vehicle is to be operated in a subfreezing environment, the flow controller 210 may initiate a control signal 640 for placement of the second control valve 260 into a first (bypass) state. In a bypass state (S1), the second control valve 260 activates a first input port 650 of the second control valve 260 so that the radiator bypass path 630 is selected as the propagation path for the coolant 610. This avoid the coolant 610 from unintended thermal effects caused by exposure of the coolant 610 via the radiator 332 to sub-freezing temperatures, especially at an initial startup period of the electric vehicle. This avoids the coolant 610 from being needlessly cooled when heating of the HV battery packs 130, 132, 134, 136 and/or 137 is necessary for placement of these HV battery packs 130, 132, 134, 136 and/or 137 into a prescribed thermal state that optimizes their performance.

Otherwise, as a default or based on control signaling by the flow controller 210, the radiation path 620 is selected as the propagation path for the coolant 610 to allow the thermal system 300 to utilize the radiator 332 as a heat sink (heat distribution source). More specifically, a second input port 660 of the second control valve 260 is configured to receive the coolant 610 via the radiator 332 in lieu of the coolant 610 being propagating through the first input port 650.

V. Thermal System Operational Flow

Figure 7:
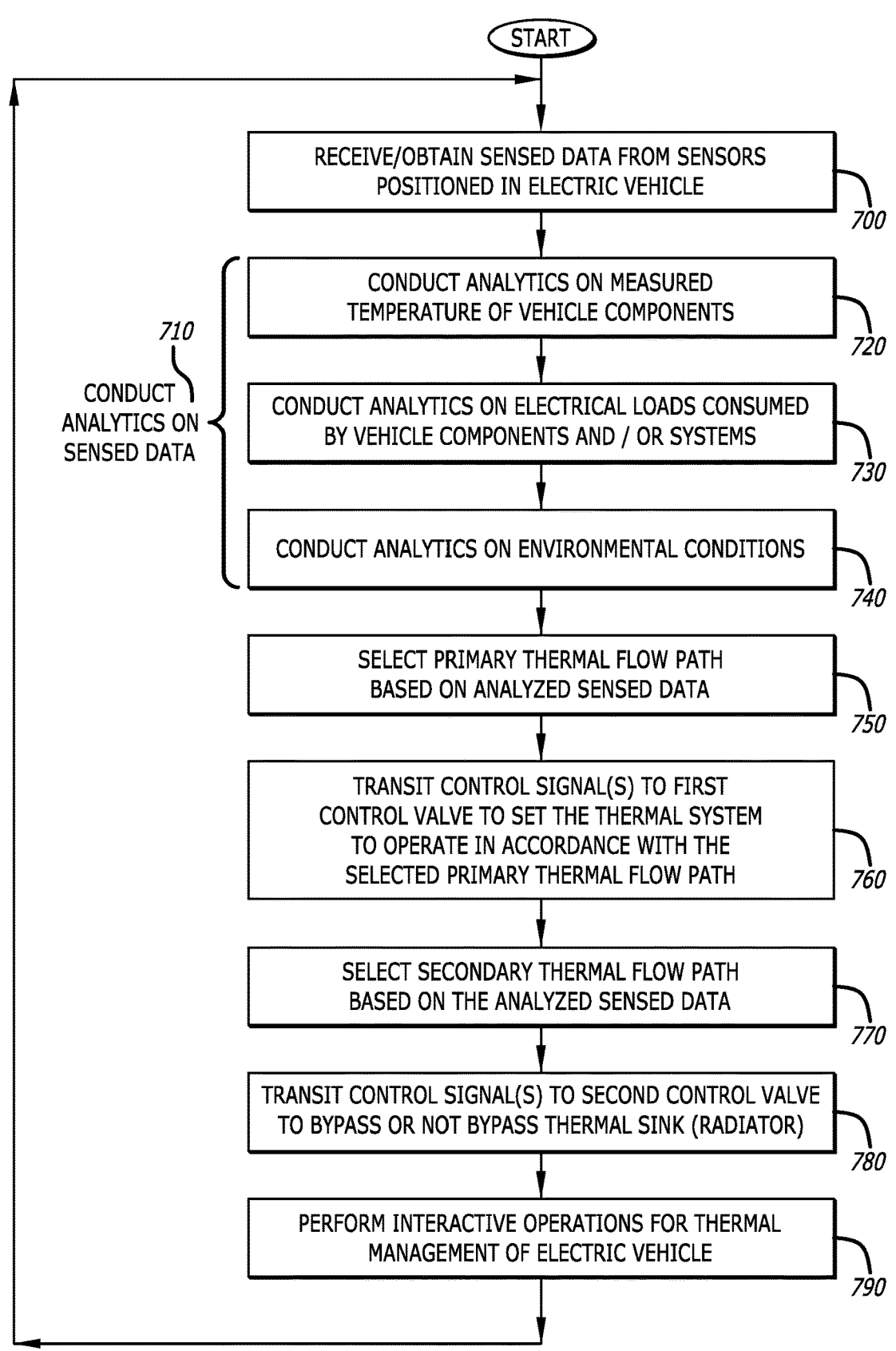
FIG. 7 is an exemplary embodiment of the operations conducted by the vehicle control system of FIGS. 1-2 in adjusting the thermal flow paths based on the drive profile and environmental conditions.

Referring now to FIG. 7, an exemplary embodiment of the operations conducted by the vehicle control system 160 of FIGS. 1-2 in adjusting the thermal flow paths based on the drive profile and environmental conditions is shown. Herein, the vehicle control system receives or obtains sensed data from sensors positioned with the electric vehicle (operation 700). Thereafter, the vehicle control system conducts analytics on the sensed data (operation 710).

In particular, the vehicle control system conducts analytics on the sensed data such as the measured temperature for certain vehicle components deployed within the electric vehicle (operation 720). These vehicle components may include, but are not limited or restricted to the HV battery packs, motor, gearbox, drive inverter, power converter, HVAC system, and/or charger.

Additionally, the vehicle control system conducts analytics on the sensed data such as electrical loads being consumed by different vehicle components or systems within the electric vehicle (operation 730). The level of electrical consumption may be based, at least in part, on (a) terrain (e.g., uphill, downhill, etc.), (b) speed, (c) selected passenger controls, and/or (d) whether the electric vehicle is in a charging state or not. Furthermore, the vehicle control system conducts analytics on the sensed data such as the environmental conditions measured by one or more of the sensors, including outside temperature (operation 740).

Thereafter, based on the sensed data, the vehicle control system selects a primary thermal flow path to be utilized by the thermal system (operation 750). The primary thermal flow path may constitute the parallel thermal loops or the serial thermal loop as described above. Thereafter, the vehicle control system transmits a control signal to a first control valve to set the primary thermal flow path as the parallel thermal loops or as the serial thermal loop (operation 760).

Additionally, based on the analyzed sensed data, the vehicle control system selects a secondary thermal flow path to direct the coolant to propagate through or bypass the radiator (operation 770). Thereafter, the vehicle control system transmits a control signal to a second control valve to set the secondary thermal flow path as the radiator path or the radiator bypass path (operation 780).

The vehicle control system performs these operations iteratively during normal operation of the electric vehicle and during charging of the electric vehicle (operation 790).

In the foregoing description, the invention is described with reference to specific exemplary embodiments thereof. However, it will be evident that various modifications and changes may be made thereto without departing from the broader spirit and scope of the invention.

What is claimed is:

1. A thermal system for an electric vehicle, comprising:
a vehicle control system;
one or more sensors; and
a first control valve that, upon placement into a first operational state by the vehicle control system, separates a flow of coolant for thermally adjusting one or more components within the electric vehicle into parallel thermal loops, the parallel thermal loops include a first thermal loop responsible for thermal adjustment of a plurality of battery packs and a second thermal loop responsible for thermal adjustment of a drivetrain including at least an electric motor,
wherein the first thermal loop propagates coolant from the first control valve to each of the components in a ordered series of components including a pump, from the pump to a chiller to reduce temperature of the coolant as needed and under control of the vehicle control system, from the chiller to a heater to increase the temperature of the coolant as needed and under control of the vehicle control system, and the plurality of battery packs, and
wherein the vehicle control system is configured to set the first control valve to the first operational state or a second operational state in response to a drive profile and environmental conditions determined from the one or more sensors, the drive profile includes monitored parameters associated with an electrical load being consumed by one or more vehicle components or systems of the electric vehicle, wherein the electrical load is based, at least in part, on a driving terrain.

2. The thermal system of claim 1, wherein the first control valve, upon placement into a second operational state by the vehicle control system, alters an input/output scheme of the first control valve so that the flow of coolant through a portion of the first thermal loop is redirected to propagate through the second thermal loop.

3. The thermal system of claim 1, wherein the one or more sensors include one or more temperature sensors or one or more flow rate sensors positioned proximate to selected components within the electric vehicle.

4. The thermal system of claim 1, wherein the drive profile constitutes monitored parameters directed to current operability of the electric motor.

5. The thermal system of claim 4, wherein the monitored parameters associated with the drive profile include measured temperatures for the one or more vehicle components.

6. The thermal system of claim 4, wherein the monitored parameters associated with the drive profile include electrical loads being consumed by each of the one or more vehicle components or systems.

7. The thermal system of claim 6, wherein one or more of the electrical loads is based, at least in part, on (a) driving terrain, (b) speed, and (c) selected passenger controls directed to a selected heating, ventilation and cooling (HVAC) level for an interior cabin of the electric vehicle.

8. The thermal system of claim 1, wherein the environmental conditions include a temperature outside the interior cabin.

9. The thermal system of claim 1 further comprising:
a second control valve that, upon placement into a first operational state by the vehicle control system, routes a flow of coolant to bypass a radiator of the electric vehicle prior to routing of the flow of coolant to the first control valve.

10. The thermal system of claim 9, wherein the second control valve, when placed into a second operational state by the vehicle control system, routes the flow of coolant through radiator of the electric vehicle prior to routing of the flow of coolant to the first control valve.

11. A thermal system for an electric vehicle, comprising:
a vehicle control system;
a first control valve; and
a second control valve that, upon placement into a first operational state by the vehicle control system, routes a flow of coolant to bypass a radiator of the electric vehicle prior to routing of the flow of coolant to the first control valve,
wherein the flow of coolant is provided to the first control valve that, upon placement into a first operational state by the vehicle control system, separates a flow of coolant for thermally adjusting one or more components within the electric vehicle into parallel thermal loops including at least a first thermal loop responsible for thermal adjustment of a plurality of battery packs, the first thermal loop propagates the coolant from the first control valve to the one or more components in a specific order with the coolant to a pump, from the pump to a chiller to reduce temperature of the coolant as needed and under control of the vehicle control system, from the chiller to a heater to increase the temperature of the coolant as needed and under control of the vehicle control system, and from a header to the plurality of battery packs for return back to the first control valve, and wherein the vehicle control system is configured to set the first control valve to the first operational state or the second operational state in response to a drive profile and environmental conditions determined from one or more sensors positioned on the electric vehicle, the drive profile includes monitored parameters associated with an electrical load being consumed by one or more vehicle components or systems of the electric vehicle, wherein the electrical load is based, at least in part, on a driving terrain.

12. The thermal system of claim 11, wherein the parallel thermal loops further includes a second thermal loop responsible for thermal adjustment of a drivetrain including at least an electric motor.

13. The thermal system of claim 12, wherein the first control valve, upon placement into a second operational state by the vehicle control system, alters an input/output scheme of the first control valve so that the flow of coolant through a portion of the first thermal loop is redirected to propagate through the second thermal loop.

14. The thermal system of claim 13, wherein the one or more sensors include one or more temperature sensors or one or more flow rate sensors positioned proximate to selected components within the electric vehicle.

15. The thermal system of claim 14, wherein the drive profile includes monitored parameters associated with an electrical load being consumed by one or more vehicle components or systems, wherein the electrical load is based, at least in part, on a selected heating, ventilation and cooling (HVAC) level for an interior cabin of the electric vehicle.

16. The thermal system of claim 1, wherein the drive profile includes monitored parameters associated with an electrical load being consumed by one or more vehicle components or systems, wherein the electrical load is based, at least in part, on a selected heating, ventilation and cooling (HVAC) level for an interior cabin of the electric vehicle.

17. A thermal system for an electric vehicle, comprising:
a vehicle control system; and
a first control valve that, upon placement into a first operational state by the vehicle control system, separates a flow of coolant for thermally adjusting one or more components within the electric vehicle into parallel thermal loops, the parallel thermal loops include a first thermal loop responsible for thermal adjustment of a plurality of battery packs and a second thermal loop responsible for thermal adjustment of a drivetrain including at least an electric motor,
wherein the vehicle control system is configured to set the first control valve to a plurality the first operational state in response to a drive profile and environmental conditions determined from the one or more sensors, the drive profile includes monitored parameters associated with an electrical load being consumed by one or more vehicle components or systems of the electric vehicle, wherein the electrical load is based, at least in part, on a driving terrain.

18. The thermal system of claim 17, wherein the first thermal loop propagates coolant from the first control valve to each of the components in a ordered series of components including a pump, from the pump to a chiller to reduce temperature of the coolant as needed and under control of the vehicle control system, from the chiller to a heater to increase the temperature of the coolant as needed and under control of the vehicle control system, and the plurality of battery packs.

* * * * *